United States Patent [19]

Moorhead

[11] 4,449,316
[45] May 22, 1984

[54] SNAKE TRAP

[76] Inventor: Albert B. Moorhead, P.O. Box 413, Conroe, Tex. 77301

[21] Appl. No.: 413,565

[22] Filed: Aug. 31, 1982

Related U.S. Application Data

[62] Division of Ser. No. 128,399, Mar. 10, 1980, Pat. No. 4,370,823.

[51] Int. Cl.³ ............................................. A01M 23/08
[52] U.S. Cl. ............................................. 43/10; 43/58; 256/1
[58] Field of Search ............ 43/7, 10, 58, 64, 65, 43/100, 101, 121; 256/1, 23, 45; 47/20, 21, 26, 28 R, 31

[56] References Cited

U.S. PATENT DOCUMENTS 4,301,996 11/1981 Holyoak ................................. 43/10

FOREIGN PATENT DOCUMENTS 1286356 3/1978 France ................................. 47/28

*Primary Examiner*—Nicholas P. Godici
*Assistant Examiner*—Kurt Rowan
*Attorney, Agent, or Firm*—Pravel, Gambrell, Hewitt, Kirk & Kimball

[57] ABSTRACT

A device for the trapping of snakes and similar animals having a sheet of netting to be placed on the ground shaped so that a plurality of areas of the netting are substantially non-horizontal to the ground. A snake attempting to traverse the sheet will pass into an interstices until its body size prevents forward motion. The scales of the snake will catch on the strands of the netting preventing the snake from retreating from the netting.

3 Claims, 7 Drawing Figures

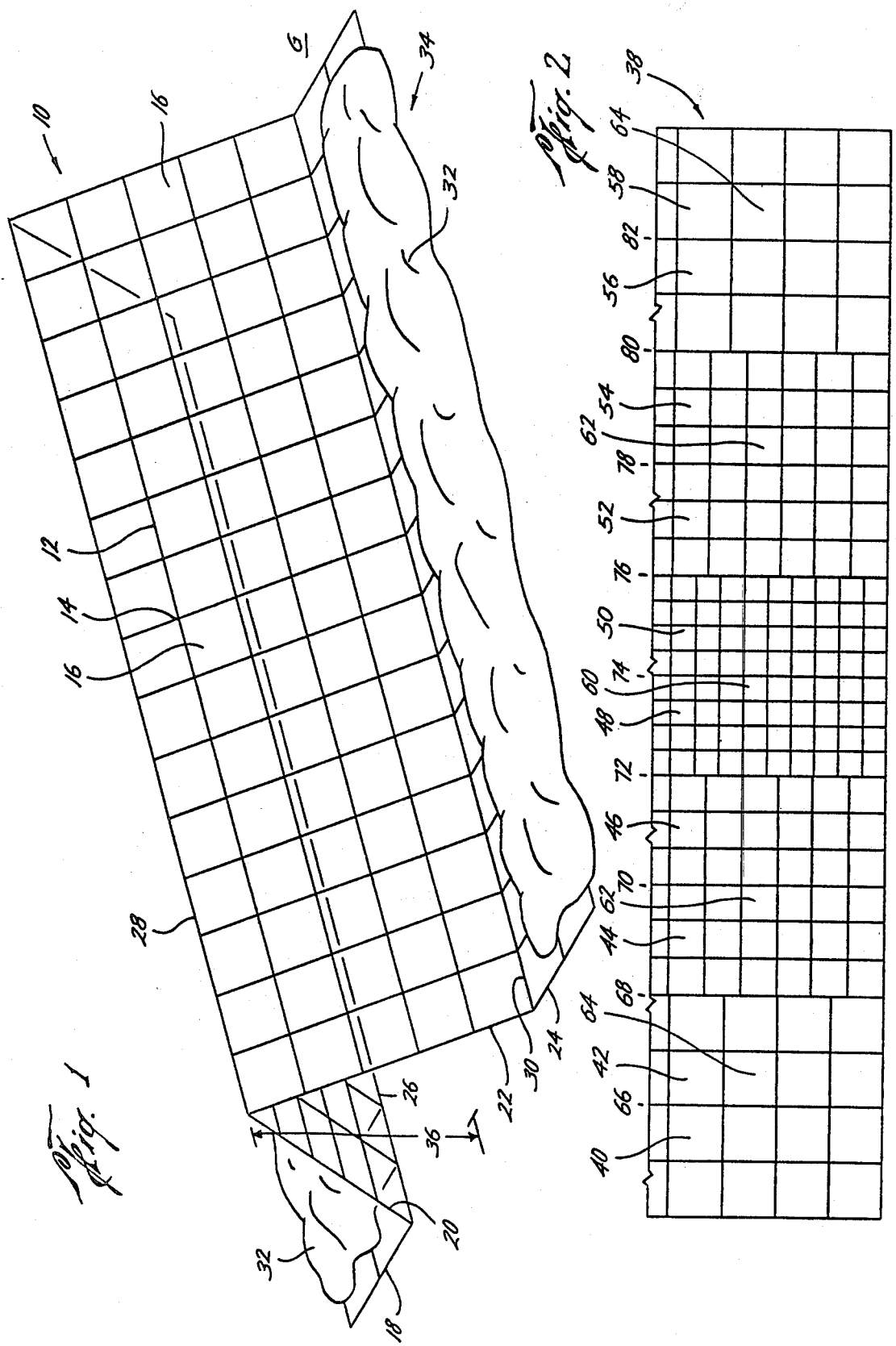

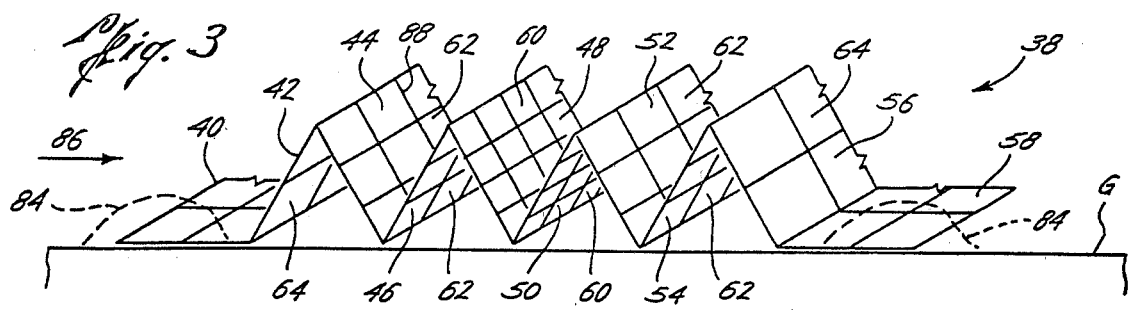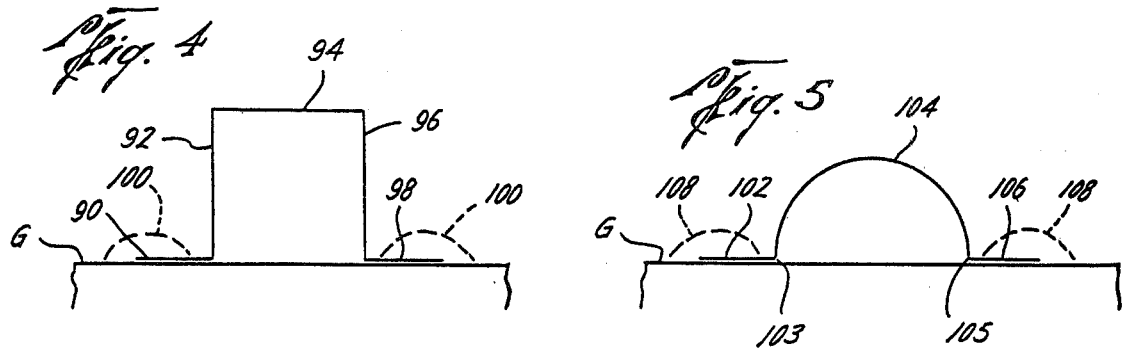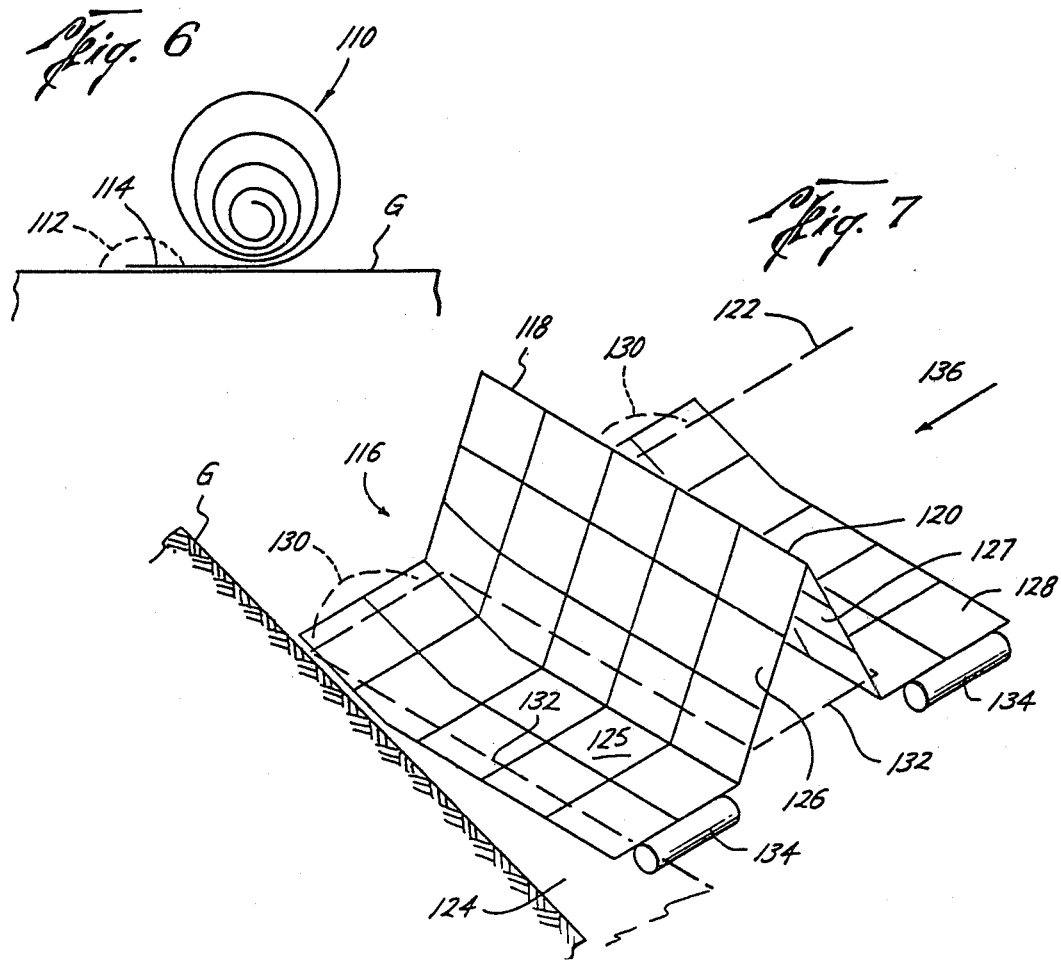

SNAKE TRAP

This is a division of application Ser. No. 128,399, filed Mar. 10, 1980 now U.S. Pat. No. 4,370,823.

FIELD OF THE INVENTION

This invention pertains to devices for the trapping of snakes and other similar animals. More specifically, this invention pertains to devices for the trapping of snakes and other similar animals in the interstices of netting.

DESCRIPTION OF THE PRIOR ART

Traps using netting are well known in the art. For example, U.S. Pat. Nos. 82,913, 699,041 and 3,691,667. These traps, however, use the netting to form areas to control the movement of the animals rather than using the interstices of the netting itself to capture and hold the animal. Other patents such as U.S. Pat. No. 912,134 are for traps in which an animal may advance past a portion of the trap but then is trapped because it is unable to move further or to retreat. However, these do not disclose a netting as being the object through which the animal moves nor are they adapted for the physiology of a snake.

SUMMARY OF THE INVENTION

This invention is a device for the capturing of snakes and other similar animals in which a sheet of netting is placed on the ground and the netting is shaped so tht there is a plurality of areas of the netting which are substantially non-horizontal to the ground. Weights are mounted on a portion of the netting to form a releasable anchor. A snake traversing the ground will pass into an interstice of the netting in at least one of the non-horizontal areas, proceed forward, perhaps moving through other interstices in other substantially non-horizontal areas of the netting, until the snake is no longer able to move forward because of an increase in body size in comparison to the interstices. When the snake attempts to retreat, the scales of the snake's body catch on the strands of the netting and the snake will be unable to move backwards and thereby the snake is trapped.

BRIEF DESCRIPTION OF THE DRAWINGS

FIG. 1 is a perspective view of one embodiment of the invention placed on the ground for trapping of snakes with two substantially non-horizontal areas.

FIG. 2 is a top view of an embodiment of the invention unfolded and having areas of netting with different size interstices.

FIG. 3 is a perspective view of the embodiment of FIG. 2 showing the sheet of netting folded and mounted for use.

FIG. 4 is a cross-sectional view of another embodiment of the invention.

FIG. 5 is a cross-sectional view of another embodiment of the invention.

FIG. 6 is a cross-sectional view of another embodiment of the invention.

FIG. 7 is a perspective view of another embodiment of the invention suitable for placement in water along a shoreline.

DESCRIPTION OF PREFERRED EMBODIMENTS

A first embodiment of the present invention is shown in FIG. 1. A sheet of netting 10 is formed by a plurality of strands 12. The strands 12 may be made of a number of materials such as wire or thread but will preferably be formed of a polyethylene material or a nylon thread with a polyethylene coating. The strands 12 will form the netting 10 by being joined at the points of intersection 14 of the strands. The intersecting strands 12 may be joined by knotting or tieing with other materials but will preferably be sealed together by processes well known in the art. The shape of the net openings or interstices 16 may also vary but preferably are square or rectangular because of the simplicity of manufacture.

The material of the netting 10 must be such that the netting 10 may be folded to form various areas. Shown in FIG. 1 are a first area 18, second area 20, third area 22 and fourth area 24 formed by folding the netting 10 along first fold 26, second fold 28 and third fold 30, preferably parallel to each other so that the areas 18, 20, 22 and 24 are serially adjacent. The folds 26, 28 and 30 are shown as being formed along strands but may be formed anywhere along the netting 10 so long as the netting 10 will retain the desired shape. One method of forming such areas and folds in polyethylene material consists of folding the netting over a heated metal wire for a brief time then removing the netting, whereby the lines desired to divide the areas are permanently creased into the netting.

The operation of this embodiment of the present invention may be seen by reference to FIG. 1. The trap comprises a sheet of netting 10, shaped into areas 18, 20, 22 and 24, which is placed upon the ground G with areas 18 and 24 generally flat on the ground G and areas 20 and 22 above and at an angle or non-horizontal relative to the ground G and shaped to form an inverted V. Some earth 32 or other substance is placed along the netting areas 18 and 24 as weights to releasably secure the netting 10 to the ground G to permit limited transverse movement of the trap 10 after the snake has been caught in the netting, as will be more fully explained. A snake traversing the ground G in the direction of arrow 34 and encountering the netting 10 will continue by entering one of the openings or interstices of the netting 10. Since a snake's body size in cross-section increases from its head rearwardly of its length for a substantial distance, as the snake progresses, the portion of its body going through the interstices becomes larger and if the snake is sufficiently large or the interstices sufficiently small, at some point the snake will no longer be able to progress forward. Since the snake is thus caught or trapped in the forward direction, his instinct to escape causes him to try to move bckwards or retreat. The snake upon moving backwards rubs its scales along the strands 12 of the netting 10 whereupon the scales will become caught and act to lock the snake in position in the netting. The size of the snake in relation to the interstices 16 will prevent forward motion; the scales lapping over the strands 12 will prevent backwards motion.

The netting 10 is held in a fixed location on the ground by the dirt, or other retaining means 32 so that the net 10 will, if the motion of the snake is sufficient, move transversely with the snake and further entangle the snake. If the netting 10 were immovably secured, it is possible that the force of the snake's motion would tear the netting 10 or allow the snake to squeeze through the interstices 16.

Factors to be considered in determining the exact measurements of an embodiment relate to the type of snake or snakes to be caught. If the openings or interstices of the net are so small that the snake cannot get its head and a portion of its body therethrough, the snake will be unable to enter any of the interstices and therefore will be able to go over or around the trap. If the openings or interstices are so large that the snake can go therethrough without getting squeezed by the netting around the opening it is passing through, the snake will be able to completely traverse the netting without being caught. As most snakes travel with their heads slightly elevated, the height 36 of the trap should be high enough so that the snake cannot go over the netting.

A second embodiment suitable for use with different sizes of snakes is shown in FIGS. 2 and 3, where the sheet of netting 38 has serially adjacent areas 40, 42, 44, 46, 48, 50, 52, 54, 56 and 58 in which the size of the net openings or interstices varies with the smallest interstices 60 being in the innermost areas 48 and 50 and the size of the interstices (such as 62 and 64) increasing with the proximity of the areas to the first area 40 and last area 58. When the embodiment of FIG. 2 has been folded for use along folds 66, 68, 70, 72, 74, 76, 78, 80 and 82, as seen in FIG. 3, the two outermost areas 40 and 58 are placed substantially flat on the ground G with weights 84 which may be mounds of earth placed on them to form a releasable anchor which permits transverse movement of the trap 38 after the snake has been caught by the net as the snake moves forwardly, in the same manner as previously explained with respect to the trap 10. The other areas 42–56 form areas which are inclined or non-horizontal relative to the ground for trapping snakes.

A snake traversing in the direction of arrow 86 will encounter interstices of steadily decreasing size. A small snake will traverse the outer areas until it reaches an inner area such as 48 wherein its size is sufficient to trap it in the smallest size interstices 60. A larger snake will become trapped in a more outwardly lying area such as in interstices 62. As in the first embodiment, the scales of the snake will become caught by the strands 88 when the snake attempts to retreat. It is likely that some snakes would be trapped in more than one area of the netting. That is, the snake's larger body portion would be trapped in an outer layer of mesh and the smaller body portion would be trapped in an inner area of mesh with smaller interstices.

The cross-sectional area of the first embodiment shown in FIG. 1 as seen from the end would show an inverted V formed by areas 20 and 22 with two outer flaps (18 and 24). This cross-sectional area could vary significantly so long as there is at least one area which is at an angle to the ground G or is substantially non-horizontal so as to entrap snakes. FIGS. 4, 5 and 6 show some other possible end view cross-sectional areas.

FIG. 4 shows a netting which has been folded into five areas 90, 92, 94, 96 and 98 with the first area 90 and last area 98 being suitable for flat placement upon the ground G. The second area 92 and fourth area 96 are substantially perpendicular to the ground and are joined by the third area 94 elevated but horizontal to the ground. The netting is releasably secured to the ground by dirt or other retaining means 10 to permit transverse movement of the trap after the snake is caught, as previously explained in connection with the other embodiments.

FIG. 5 shows a netting shaped so as to have two areas 102 and 106 suitable for plcement upon the ground and retaining means 108 thereupon and a half cylinder area 104 connected to areas 102 and 106 along the half cylinder radial edges 103 and 105. The lower portions of the half cylinder area 104 form the plurality of substantially non-horizontal areas of the present invention.

FIG. 6 shows an embodiment wherein the end view cross-section approximates a spiral. Here the netting 110 may be releasably secured to the ground G by retaining means 112 on the outer end 114 of the spiral. Areas of the continuing layers of the spiral would provide the non-horizontal surfaces of the present invention. If desired, the interstices of the netting could be made smaller as the netting spirals inwardly, so as to trap various size snakes.

The second embodiment shown in FIGS. 2 and 3 could be modified so that the replicated inverted V areas are replaced by replicated cross-sections similar to FIGS. 4 or 5 or combinations of different shapes.

An embodiment to catch snakes along a shoreline is shown in FIG. 7. A cross-sectional area similar to the embodiment of FIG. 1 is employed although other cross-sections could be used. A netting 116, shaped into four serially adjacently connected areas, with a first end 118 and a second end 120 is placed along a shoreline 122 with the first end 118 upon the ground G and the second end 120 in the water 124. First area 125 and fourth area 128 have retaining means or weights 130, such as sand placed upon them adjacent to first end 118 to form a releasable anchor. The second end 120 is maintained at a depth below the water surface 132 by the use of two semi-buoyant floats 134. Thereby, second area 126 and third area 127 are substantially non-horizontal to the water surface 132 and partly in and partly above the water. The snake moving in the direction of arrow 136 will encounter the non-horizontal areas 126 and 127 and enter through an opening or interstice and thereby become trapped as in other embodiments of the invention. Since snakes travel in the water with their heads at varying levels above, on and below the surface, the buoyancy of the floats 134 may be adjusted or even removed in some conditions so that the substantially non-horizontal areas are disposed at a sufficient depth in the water and above the water as to entrap a snake traveling at a normal level for that snake. In some cases, the trap is set so that it is entirely below the water level and in other cases, it is set so that the non-horizontal areas are entirely above the water level.

Because of the simple construction and light weight nature of the present invention, the snake trap is well suited to be employed in camping situations in which the netting may be employed around a sleeping bag, or the front of a tent. This provides a measure of security for a person sleeping outdoors in an area where snakes are located. Also, the invention is useful for trapping snakes in yards or gardens to keep them from entering such areas, thereby reducing the danger of humans being bitten by snakes. Since the snakes are caught alive, a person may also use the traps of this invention for catching snakes for specimens, study or any other purpose.

The foregoing disclosure and description of the invention are illustrative and explanatory thereof and various changes in the size, shape and materials as well as the details of the illustrated construction may be made without departing from the spirit of the invention.

I claim:

1. A device for the trapping of snakes and similar animals, comprising:
   at least four areas of netting;
   said netting areas being serially adjacently connected;

the first and last of said netting areas being adapted to be placed substantially flat on the ground;

other of said netting areas being substantially non-horizontal to the ground; and, the interstices of said netting areas varying in size from area to area.

2. A device for the trapping of snakes and similar animals, comprising:

at least four areas of netting;

said netting areas being serially adjacently connected;

the first and last of said netting areas being adapted to be placed substantially flat on the ground;

other of said netting areas being substantially non-horizontal to the ground; and, said other of said netting areas are shaped to form multiple inverted V's.

3. The device of claim 2, wherein:

the interstices of said other areas vary; and, the size of said interstices increases with the proximity of said other areas to said first and last area.

* * * * *